United States Patent
Iino et al.

(10) Patent No.: US 8,140,194 B2
(45) Date of Patent: Mar. 20, 2012

(54) SUPPLY-AND-DEMAND CONTROL SYSTEM OF DISTRIBUTED AND COORDINATED TYPE, FOR USE IN POWER SYSTEMS

(75) Inventors: Yutaka Iino, Kawasaki (JP); Yasuhiro Taguchi, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 234 days.

(21) Appl. No.: 12/694,428

(22) Filed: Jan. 27, 2010

(65) Prior Publication Data

US 2010/0191996 A1    Jul. 29, 2010

(30) Foreign Application Priority Data

Jan. 28, 2009  (JP) ................. 2009-016958

(51) Int. Cl.
  *G06F 1/26*   (2006.01)
(52) U.S. Cl. .................... 700/295; 700/297
(58) Field of Classification Search .............. 700/286, 700/295, 297
See application file for complete search history.

(56) References Cited

U.S. PATENT DOCUMENTS

| | | | |
|---|---|---|---|
| 7,430,545 B2 * | 9/2008 | Kanbara et al. | 705/412 |
| 2005/0015283 A1 | 1/2005 | Iino et al. | |
| 2011/0172846 A1 * | 7/2011 | Kulyk et al. | 700/296 |

FOREIGN PATENT DOCUMENTS

| | | |
|---|---|---|
| JP | 10-94199 | 4/1998 |
| JP | 2002-095168 | 3/2002 |
| JP | 2005-328622 | 11/2005 |
| JP | 2008061417 A * | 3/2008 |
| JP | 2008-104269 | 5/2008 |

OTHER PUBLICATIONS

Machine Translation of JP 2008-061417 (Mar. 2008).*
Ren et al., "Distributed Consensus in Multi-vehicle Cooperative Control," Springer-Verlag (2008), title page, bibliography page, contents page, and pp. 25-27, and 38-41.
Japanese Patent Office Notice of Reasons for Rejection Issued in Counterpart Application No. 2009-016958 dated Oct. 29, 2010 (4 pgs. total).

* cited by examiner

*Primary Examiner* — Ryan Jarrett
(74) *Attorney, Agent, or Firm* — Finnegan, Henderson, Farabow, Garrett & Dunner, L.L.P.

(57) ABSTRACT

According to one embodiment, each of the nodes incorporated in the respective electrical apparatuses that constitute a local power system establishes a communication path connected to any adjacent node, transmits and receive average supply-and-demand state data to and from the adjacent node through the communication path. Each node adjusts (increases or decreases) the power to generate or consume in it, on the basis of the average supply-and-demand state data. Each node performs a supply-and-demand control of distributed and coordinated type, in which the average supply-and-demand state value is corrected based on the value by which the power has been adjusted (increased or decreased) and the average supply-and-demand state value thus corrected is supplied to the adjacent node through the connection path.

17 Claims, 8 Drawing Sheets

SUPPLY-AND-DEMAND CONTROL SYSTEM OF DISTRIBUTED AND COORDINATED TYPE, FOR USE IN POWER SYSTEMS

CROSS-REFERENCE TO RELATED APPLICATIONS

This application is based upon and claims the benefit of priority from prior Japanese Patent Application No. 2009-016958, filed Jan. 28, 2009, the entire contents of which are incorporated herein by reference.

BACKGROUND OF THE INVENTION

1. Field of the Invention

The present invention relates generally to a supply-and-demand control system for use in local power systems, each having power generation units and load units. More particularly, the invention relates to a supply-and-demand control system of distributed and coordinated type.

2. Description of the Related Art

In most commercial power systems, it is important to control the power demand and supply in good balance in the local power systems installed at the individual power consumers in order to achieve stable power supply to each power consumer. To achieve stable power supply, it is advisable to use positively variable power resources such as solar generation units and wind generation units. Control techniques that can drive electrical loads in energy-saving mode and can stabilize the power supply to the power consumers are demanded.

The loads of various electric apparatuses that are used in each power consumer are important equipment that governs production activities. In view of this, it is difficult to accomplish a power control at the load side, which is known as "demand-side control (DSC)" or "demand-side management (DSM)". Hence, in practice, the demand and supply of power are controlled by performing a minute control of power at the power generation equipment, thereby absorbing changes in the demand and supply. Inevitably, the supply-and-demand control system used is complicated, increasing the system cost and the engineering cost.

Power supply control and communication systems have been proposed, each designed to control the demand and supply of power in a group of electric equipment. See, for example, Jpn. Pat. Appln. KOKAI Publication No. 10-094199. The system disclosed in this document comprises an equipment management server and a supply-and-demand monitor center. The server registers and manages the individual apparatuses. The supply-and-demand monitor center controls the demand and supply of power. More precisely, the supply-and-demand monitor center calculates the electricity that can be consumed in the entire equipment and allows each apparatus to use a specific amount of power, thus accomplishing DSC.

The system disclosed in the above-identified document needs not only the equipment management server and the supply-and-demand monitor center, but also a communication system. It is inevitably a huge system as a whole and requires a high installation cost. Further, its overall configuration must be changed every time new electric equipment is introduced or the superannuated equipment is discarded. Both the engineering cost and the maintenance cost will inevitably increase.

As a system that performs the supply-and-demand control of power, a supply-and-demand control system applied to a microgrid is proposed (see, for example, Jpn. Pat. Appln. KOKAI Publication No. 2008-104269.) The microgrid is a system includes regional power supplies that can generate power by itself and operate independently of the power supply system supplying power to general power consumers, in order to reduce the emission of carbon dioxide ($CO_2$). Note that the regional power supplies are, for example, fuel cells, solar generation units and wind generation units. The microgrid is a system that links these regional power supplies and controls the power supply. Thus, the regional power supplies can be effectively used when the commercially available power system breaks down or when the power demanded is small. The supply-and-demand control system used in the microgrid has a supply-and-demand server that registers both the power supply apparatuses and the load apparatuses and controls the outputs of the power supply apparatuses in accordance with the power consumed at the load apparatuses.

The supply-and-demand control system used in the microgrid is, however, a huge system that include fuel cells, solar generation units, wind generation units, etc., installed in cities, towns, villages and districts. Its installation cost is very high. Moreover, its engineering cost and its system maintenance cost may increase if its configuration is changed, because the server alone controls the demand and supply of power at all individual apparatuses.

BRIEF SUMMARY OF THE INVENTION

An object of this invention is to provide a supply-and-demand control system of distributed and coordinated type, in which nodes incorporated in a plurality of power generation apparatuses and the nodes incorporated in a plurality of load apparatuses operate in coordination, each performing self-control and changing the power to generate or consume in accordance with its power supply-and-demand state.

A system according to an aspect of this invention comprises: a plurality of nodes incorporated in electrical apparatuses, respectively, each electrical apparatus including at least one of a power generation apparatus and a load apparatus, either supplied with power from a commercially available power system; and a communication unit configured to achieve communication between the nodes, wherein each of the nodes comprises: a communication path unit configured to establish a communication path for transmitting and receiving data to and from any adjacent node through the communication unit; a communication control unit configured to receive average supply-and-demand state data from the adjacent node through the communication path established; and a controller configured to adjust the power to generate or consume in the electrical apparatus incorporating the node, in accordance with the average supply-and-demand state data, and to calculate an average supply-and-demand state value corrected based on the value by which the power has been adjusted.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described with reference to the accompanying drawings.

[Configuration of the System]

Figure 1:
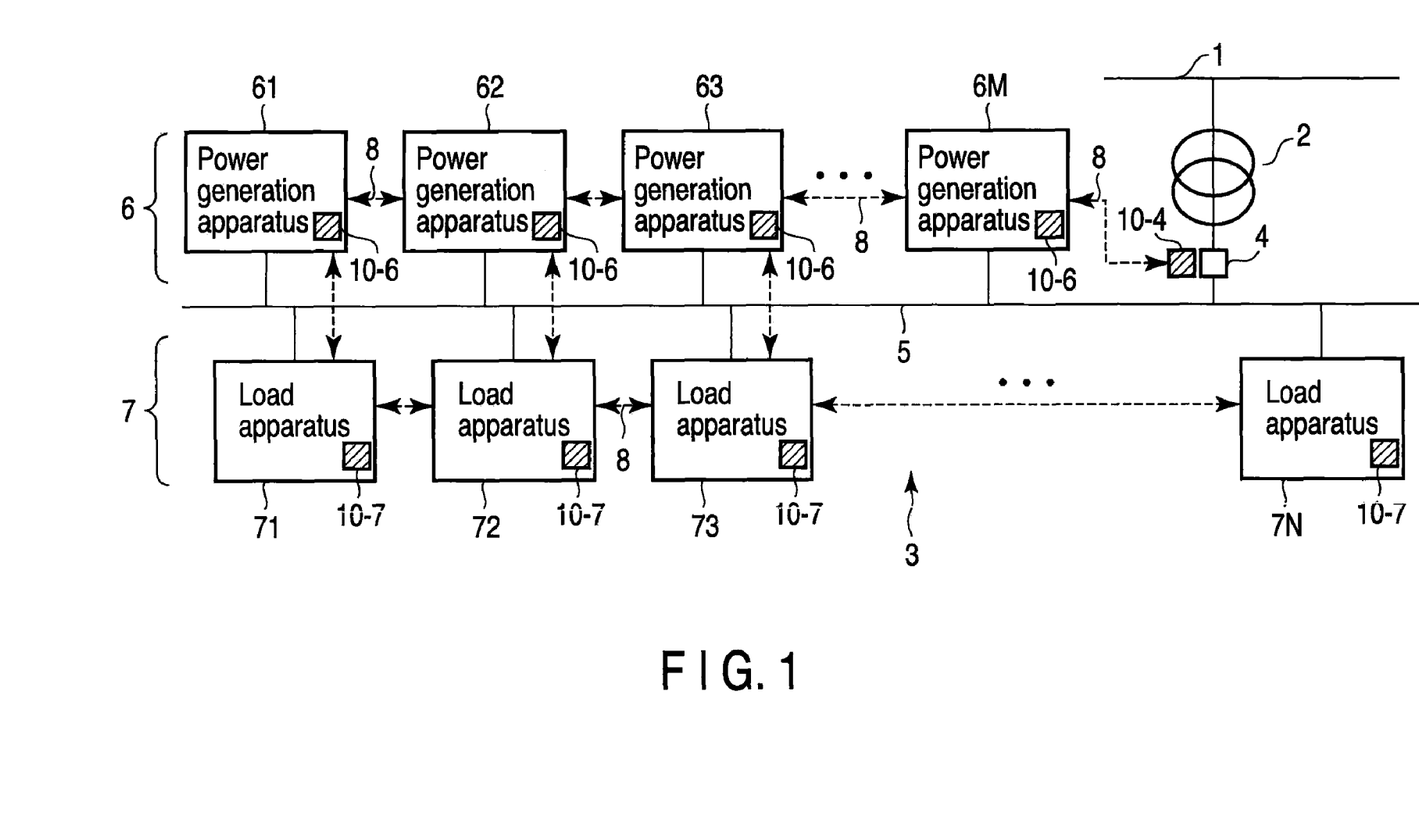
FIG. 1 is a block diagram showing the configuration of a supply-and-demand control system according to an embodiment of this invention.
Figure 9:
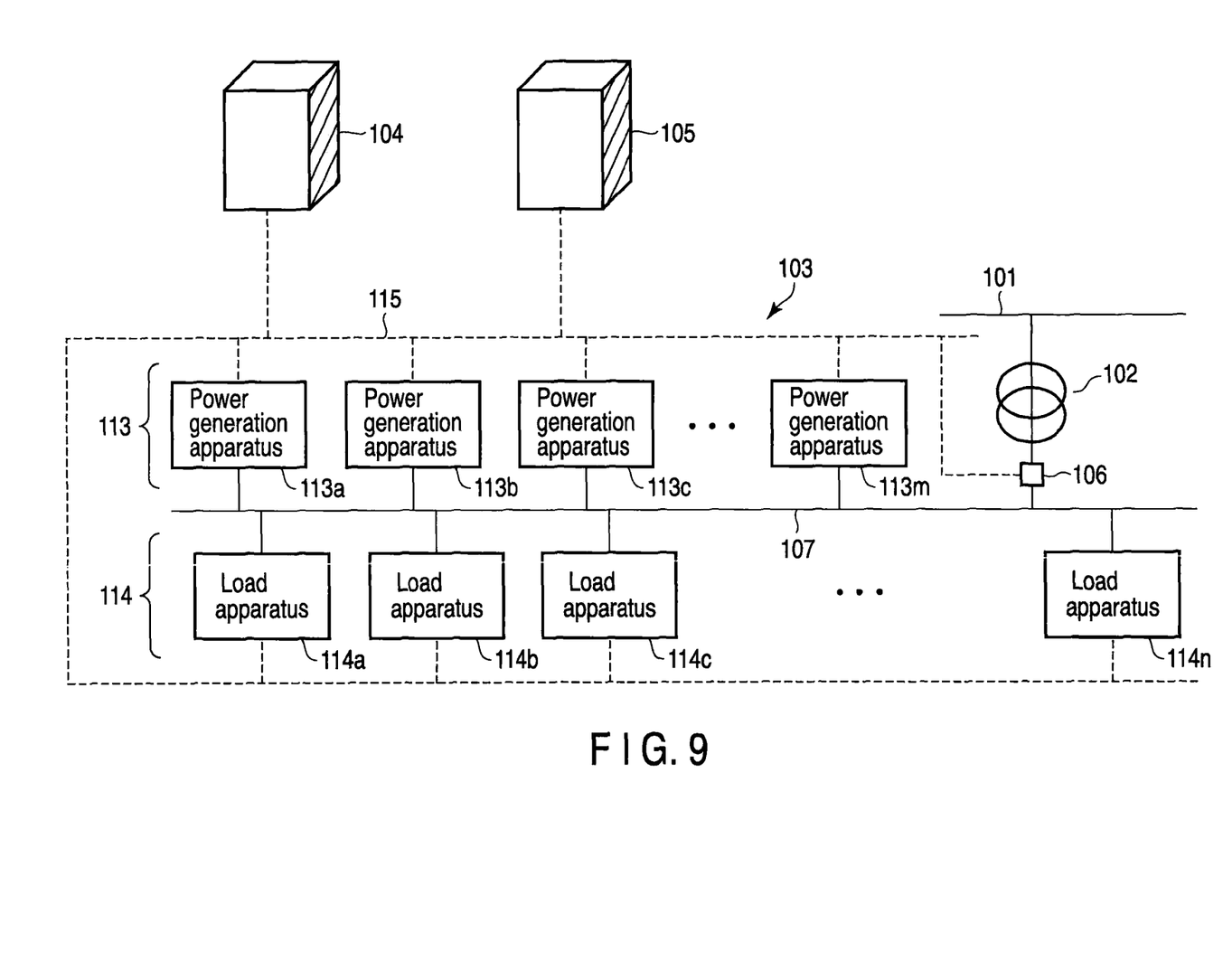
FIG. 9 is a block diagram explaining the basic configuration of the supply-and-demand control system.

FIG. 1 is a block diagram showing the configuration of a supply-and-demand control system of distributed and coordinated type, according to an embodiment of this invention. FIG. 9 is a block diagram explaining the basic configuration of a supply-and-demand control system designed for use in local power systems.

As shown in FIG. 9, the supply-and-demand control system comprises a local power system 103, an equipment management server 104, and a supply-and-demand monitor server 105. The local power system 103 is connected to a commercially available power system 101. The local power system 103 has a power-receiving side transformer 102, a power measuring device 106, and a power cable 107. The power measuring device 106 is connected to the secondary winding of the power-receiving side transformer 102 and is connected by the power cable 107 to a power-supply equipment group 113 and a load equipment group 114.

The power-supply equipment group 113 is composed of power generation apparatuses 113a to 113m such as solar generation units, wind generation units and fuel cells. The load equipment group 114 is composed of load apparatuses 114a to 114n that consume electric power. The power-supply equipment group 113 and the load equipment group 114 are connected to each other by a communication line 115. To the communication line 115, the equipment management server 104 and the supply-and-demand monitor server 105 are connected.

The configuration of the supply-and-demand control system of distributed and coordinated type, according to this embodiment, will be described with reference to FIG. 1.

As FIG. 1 shows, in the supply-and-demand control system supply-and-demand control system (hereinafter called "system," in some cases), a local power system 3 is connected via a power-receiving side transformer 2 to a commercially available power system 1. The local power system 3 has a power measuring device 4, a power cable 5, power-supply equipment group 6 and a load equipment group 7, in addition to the power-receiving side transformer 2. The power measuring device 4, power-supply equipment group 6 and load equipment group 7 are connected to the power cable 5.

The power-supply equipment group 6 is composed of various power generation apparatuses 61 to 6M such as solar generation units, wind generation units and fuel cells. The load equipment group 7 is composed of various load apparatuses 71 to 7N such as electric apparatuses and motors that consume electric power. Hereinafter, the power-supply equipment group 6 and load equipment group 7 will be generally called "electric equipment groups 6 and 7" in some cases.

This system further has distributed-and-coordinated type control nodes (hereinafter called "node" in some cases) 10-4, 10-6 and 10-7. Node 10-4 is incorporated in the distributed and coordinated type. Nodes 10-6 are incorporated in the power-supply equipment group 6. Nodes 107 are incorporated in the load equipment group 7. Nodes 10-4, 10-6 and 10-7 constitute a communication path, each able to communicate with any adjacent node to exchange data through a communication medium 8. The communication medium 8 is, for example, radio wave, communication cable, power supply cable, or communication network (e.g., LAN). In the system according to this embodiment, the members of only the power-supply equipment group 6 incorporate nodes 10-6, or the members of only the load equipment group 7 may incorporate nodes 10-7.

[Configuration of the Node]

Figure 2:
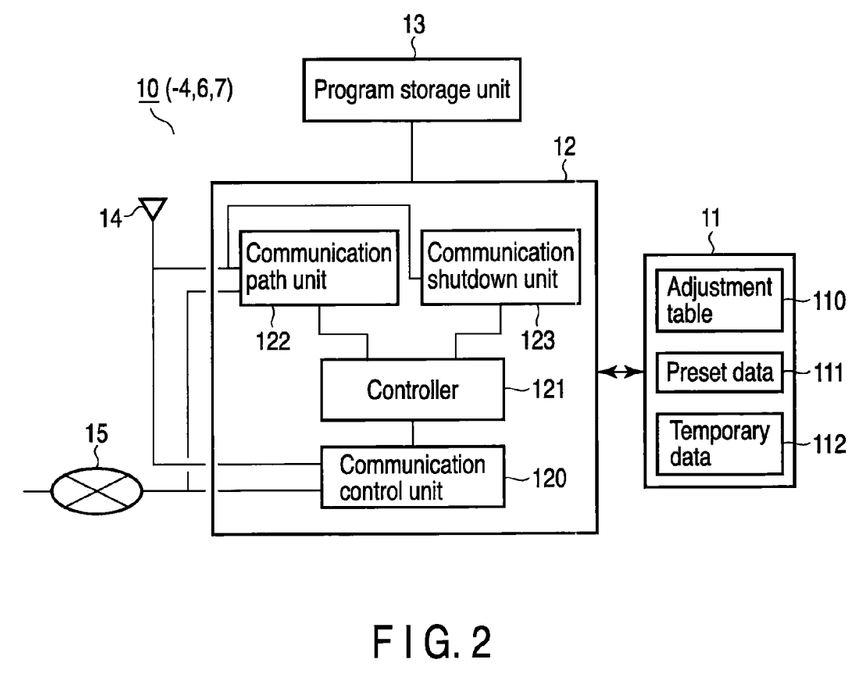
FIG. 2 is a block diagram showing the configuration of one of the nodes used in the embodiment.

FIG. 2 is a block diagram showing the basic configuration each of nodes 10-4, 10-6 and 10-7. For convenience, each node will be described as "node 10."

As shown in FIG. 2, node 10 has a data storage unit 11, a control unit 12, and a program storage unit 13. The data storage unit 11 stores an adjustment table 110, preset data 111, and temporary data 112, which will be described later. The program storage unit 13 stores programs based on a consensus algorithm, and self-control programs. The consensus algorithm will be explained later.

The adjustment table 110 is composed of the data defining the power generation characteristics of the power generation apparatuses 61 to 6M (each incorporating a node) and the load characteristics (power-consuming characteristics) of the load apparatuses 71 to 7N (each incorporating a node), flags each representing on-state or off-state of each of the apparatuses 61 to 6M and 71 to 7N, and the data defining the operating conditions that adjust the power to generate in each power generation apparatus and the power to use in each load apparatus. The preset data 111 is composed of the ID data of each node, the ID data items of other nodes adjacent to and accorded with the node and the data representing how much the apparatuses 61 to 6M and 71 to 7N, each incorporating a node, can be adjusted. The temporary data 112 includes the data that each node has received from any adjacent node and various reference data items. The reference data items include the ID data items of the nodes, which are necessary in setting a communication path (later described) and in performing a spanning tree process (later described).

The control unit 12 comprises a communication control unit 120, a controller 121, a communication path unit 122, and a communication shutdown unit 123. Note that the control unit 12 is a computer which comprises a microprocessor (CPU) and software and which performs the functions of the four units 120 to 123.

The communication control unit 120 is connected to a wireless communication antenna 14 and a communication cable 15 (or LAN). The communication control unit 120 controls the data exchange with any adjacent node. The communication control unit 120 transmits a packet that contains a connection request signal and the node ID data to an adjacent node. The communication control unit 120 transmits the data representing corrected average supply-and-demand state, too, to the adjacent node though a communication path that the communication path unit 122 has been established.

In response to the connection request signal coming from the communication control unit 120, the communication path unit 122 establishes a communication path that connects it to at least one adjacent node, upon receiving the packet that contains the ID data of the adjacent node. On receiving a shutdown request signal from any other node connected to node 10, the communication shutdown unit 123 shuts down the communication path.

The controller 121 has the function of executing the self-control programs stored in the program storage unit 13, thereby to achieve the self-control of the electric equipment groups 6 and 7. The controller 121 further executes a program based on a consensus algorithm, which will be described later. More specifically, on receiving supply-and-demand state data from the adjacent node, the controller 121 refers to the adjustment table 110, in accordance with the supply-and-demand state represented by the data it has received. Using the data it has referred to, the controller 121 adjusts the amount of power being generated or consumed in node 10. That is, the controller 121 switches on or off node 10 (either a power generation apparatus or a load apparatus), thus adjusting the power generated or consumed in node 10. The controller 121 has the function of adjusting the power generated or consumed, in accordance with the average supply-and-demand state represented by the data it has received, and the function of calculating a corrected average supply-and-demand state.

Node 10 (i.e., any one of nodes 10-4, 10-6 and 10-7) may establish a communication path connecting it to any adjacent node, while being accorded with the adjacent node. In this case, the communication control unit 120 transmits data representing the corrected average supply-and-demand state, to the adjacent node identified by the ID data.

[Operation of the System]

First, each of nodes 10-4, 10-6 and 10-7 executes a program based on the consensus algorithm. This program based on the consensus algorithm is described in Wei Ren & Randai W. Beard, "Distributed Consensus in Multi-Vehicle Control," Communication and Control Engineering Series, Springer-Verlag, London, 2008, ISBN: 978-1-84800-014-8. The consensus algorithm is formulated as the following equations (1A) and (1B). That is, if any one of the nodes, each having a plurality of communication functions, communicates with only others adjacent to it, the sate value $\xi i\,[k+1]$ that the node has at discrete time $k+1$ is expressed by the equation (1A), from the state values $\xi kj\,[k], j=1, 2, \ldots, n$, which the node and adjacent node have at time $k$.

$$\xi i[k+1] = \sum_{j=1}^{n} dij[k] \cdot \xi j[k],\ i = 1, \ldots, n \quad (1A)$$

where dij is weight coefficient.

As long as $dij \geqq 0$, the following equation (1B) does hold:

$$\sum_{j=1}^{n} dij[k] = 1,\ i = 1, \ldots, n \quad (1B)$$

Hence, the state value $\xi kj\,[k], j=1, 2, \ldots, n$, which is obtained by repeatedly updating all n nodes provided, can be mathematically proved to be shared by all nodes, because time $k \rightarrow \infty$.

How the nodes that are dispersed on a network come to have the same state value, through the application of the above-mentioned consensus algorithm, will be explained with reference to FIGS. 3A to 3D.

Figure 3A:
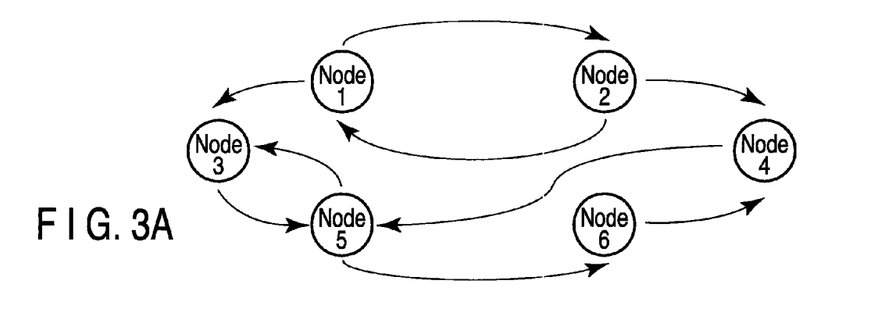
FIGS. 3A, 3B, 3C and 3D are diagrams explaining how data is shared in a network according to the embodiment.

Assume six nodes No. 1 to No. 6 are dispersed on the network. Further assume that, as shown in FIG. 3A, each node may communicates with two or more adjacent nodes in one direction, while being connected in the ordinary communication control mode. Then, the communication network constituted by the nodes should include a directed spanning tree function. This is the necessary and sufficient condition for all nodes to have the same state value as calculated by the above-mentioned consensus algorithm.

Figure 3B:
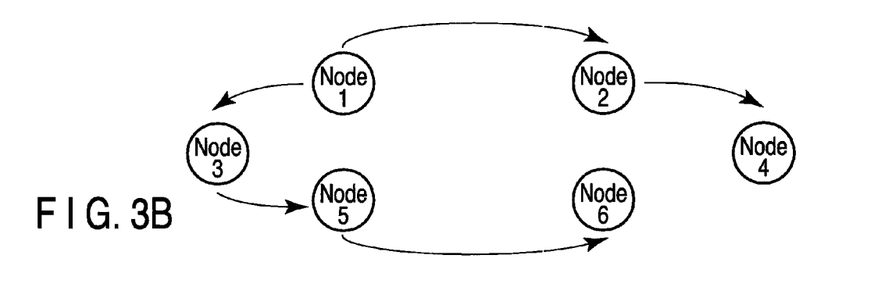

FIG. 3B is a diagram explaining a case where the ordinary communication control mode includes a directred spanning tree. Node 1 may be used as a leader. In this case, the data transmitted from node 1 reaches all other nodes 2 to 6, which are called "followers." Whether or not the network includes a directred spanning tree is determined in accordance with whether a communication path is available, through which each node other than the leader node 1 can receive data from at least two other nodes.

Figure 3C:
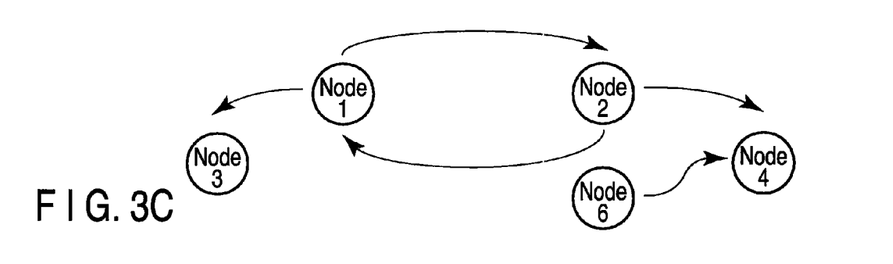

As shown in FIG. 3C, node 5, for example, may be plugged out. In this case, the communication path though which node 6 may receive data is shut down. As a result, no consensus is made among the nodes dispersed on this network. Node 6 then recognizes that it is isolated from the other nodes and needs to inform the adjacent nodes of this fact, thereby establishing a communication path.

Figure 3D:
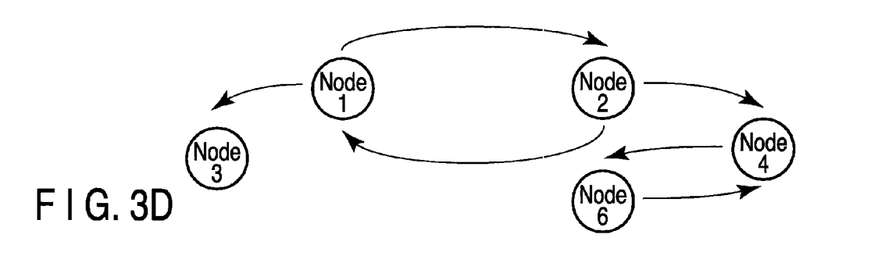

When node 5 becomes off as shown in FIG. 3D, node 6 recognizes that it is isolated from the other nodes. Node 6 then transmits a connection request signal so that it may be connected to the directred spanning tree again. A communication path is thereby established for node 6. As a result, all remaining nodes can share the same state value.

Such a connection-resuming function of the directred spanning tree is called "spanning tree function." In the present embodiment, control data is exchanged between nodes 10-4, 10-6 and 10-7 in a prescribed order of priority as shown in FIG. 1. One communication path is thereby established and used as long as the local power system 3 operates in the normal state. Another communication path may be established as a detour path when the system 3 fails to operate in normal way. This communication path is established in response to control data. The control data is called "bridge protocol data unit (BPDU)," which is used in, for example, the LAN communication.

In the present embodiment, the communication control unit 120, the communication path unit 122, and the communication shutdown unit 123, which are incorporated in each node, perform the spanning tree function by using the reference data contained in the temporary data 112 stored in the data storage unit 11. The detour path may be established by using an automatic route searching program that is applied to road-traffic control, communication line control or power line control. Alternatively, the detour path may be established by using, as needed, the known route searching method in which candidate detour paths are prepared and then selected one after another in a priority order.

In the system 3 according to this embodiment, nodes 10-4, 10-6 and 10-7 incorporated in the electric apparatuses, respectively, receive supply-and-demand state data from one another, while making a mutual consensus. In accordance with the supply-and-demand state data, each node controls the power generated or consumed in it, in coordination with some of the other nodes. The node can therefore balance the power demand and the power supply with each other. Node 10-4 provided in the power measuring device 4 does not perform an adjustment process. Rather, node 10-4 uses the power it receives, as supply-and-demand state value and transmits supply-and-demand state data to the adjacent nodes. The power the power measuring device 4 has measured corresponds to a supply-and-demand mismatch or imbalance, which is obtained by subtracting the total power generated in the local power system 3 from the total electrical load in the local power system 3.

As a result, each of nodes 10-6 and 10-7 adjusts the power generated or consumed in it, either in self-control or in coordination with any other node, on the basis of the supply-and-demand imbalance (i.e., supply-and-demand state). All nodes 10-4, 10-6 and 10-7 can therefore hold the same supply-and-demand state data that represents a good supply-and-demand balance.

The supply-and-demand state data corrected to achieve consensus between all nodes 10-4, 10-6 and 10-7 and ultimately to enable all nodes to communicate with one another shall be called "average supply-and-demand state data." The data storage unit 11 of, for example, node 10-4 of the power measuring device 4 stores preset data 111, which represents the power the local power system 3 can receive, by contract, from the commercially available power system 1.

Figure 4:
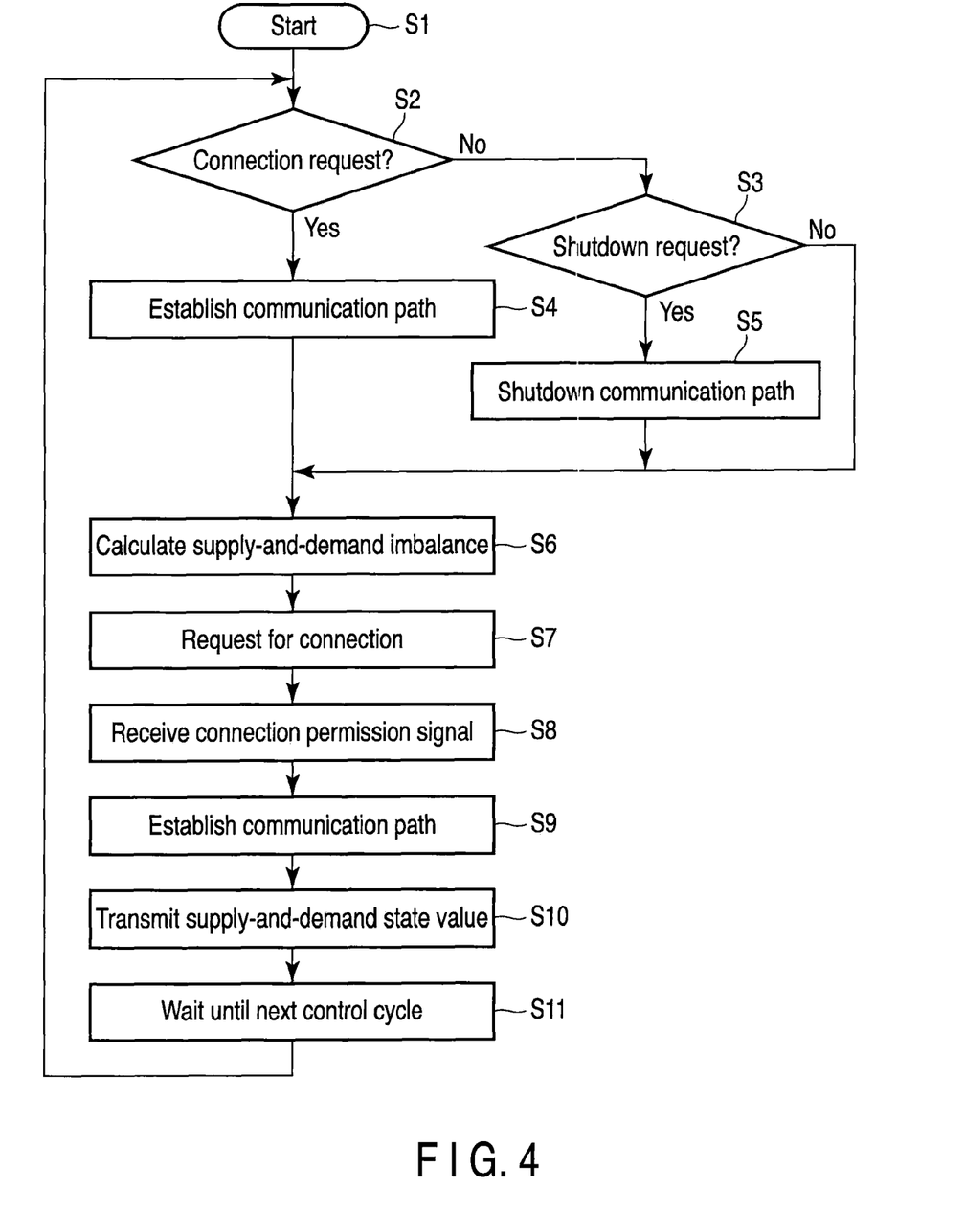
FIG. 4 is a flowchart explaining how each power-receiving node operates in the embodiment.

The basic operation that node 10-4 performs in the ordinary communication control mode will be explained with reference to the flowchart of FIG. 4. Note that the data storage units 11 of the respective nodes 10-4, 10-6 and 10-7 store preset data items 111, each contains the ID data of the node.

First, node 10-4 determines, in every control cycle, whether any adjacent node has transmitted a connection request signal or a shutdown request signal (Steps S1 to S3). If node 10-4 receives a connection request signal (YES in Step S2), node 10-4 establishes a communication path that connects it to the adjacent node (Step S4). On the other hand, if node 10-4 receives a shutdown request signal (YES in Step S3), node 10-4 shuts down the communication path and then deletes the ID data of the adjacent node from the preset data 111 (Step S5).

After node 10-4 performs the processes of Steps S4 and S5, it calculates the supply-and-demand imbalance DA in the local power system 3 (i.e., difference between the total power PT generated and the total power LT consumed by the loads) if it receives neither a connection request signal nor a shutdown request signal (Step S6).

Node 10-4 sets a tolerance condition that the supply-and-demand imbalance DA is equal to or less than the maximum power MP it can receive (so-called "contracted power") and is greater than 0, as is expressed by the following relation (2):

$$MP \geq DA(=LT-PT) \geq 0 \qquad (2)$$

From the supply-and-demand state (i.e., supply-and-demand imbalance DA), node 10-4 determines that the power the power generation apparatuses 61 to 6M, each incorporating a node 10-6, generate can be changed, and that the power the load apparatuses 71 to 7N, each incorporating a node 10-7, consume can be changed. Therefore, the communication path unit 122 of node 10-4 generates a packet that contains the ID data of node 10-4 and the connection request data. The communication path unit 122 transmits a connection request signal that enables at least two adjacent nodes 10-6 and 10-7 to communicate with each other (Step S7).

At this point, node 10-4 receives a packet from a power generation apparatus or a load apparatus from any adjacent node (Step S8). The packet contains the ID data of the adjacent node and connection permission data. On receiving this packet, node 10-4 determines that a consensus has been made with, for example, the power generation apparatus 6M. Thus, node 10-4 stores the ID data of node 10-6 of the power generation apparatus 6M, as preset data 111. Node 10-4 therefore establishes a communication path connecting it to node 10-6.

Thereafter, the communication control unit 120 of node 10-4 transmits the supply-and-demand state data generated in the process of Step S6 to the adjacent node 10-6 of the power generation apparatus 6M (Step S10). Node 10-4 waits until the next control cycle. Node 10-4 then repeats the processes of Steps S2 et seq. (Step S11).

A communication path may be established, connecting node 10-4 to the adjacent node 10-6. In this case, node 10-4 transmits a packet containing the ID data already acquired and the supply-and-demand state data showing the present state, to the adjacent node 10-6 of the power generation apparatus 6M.

Figure 5:
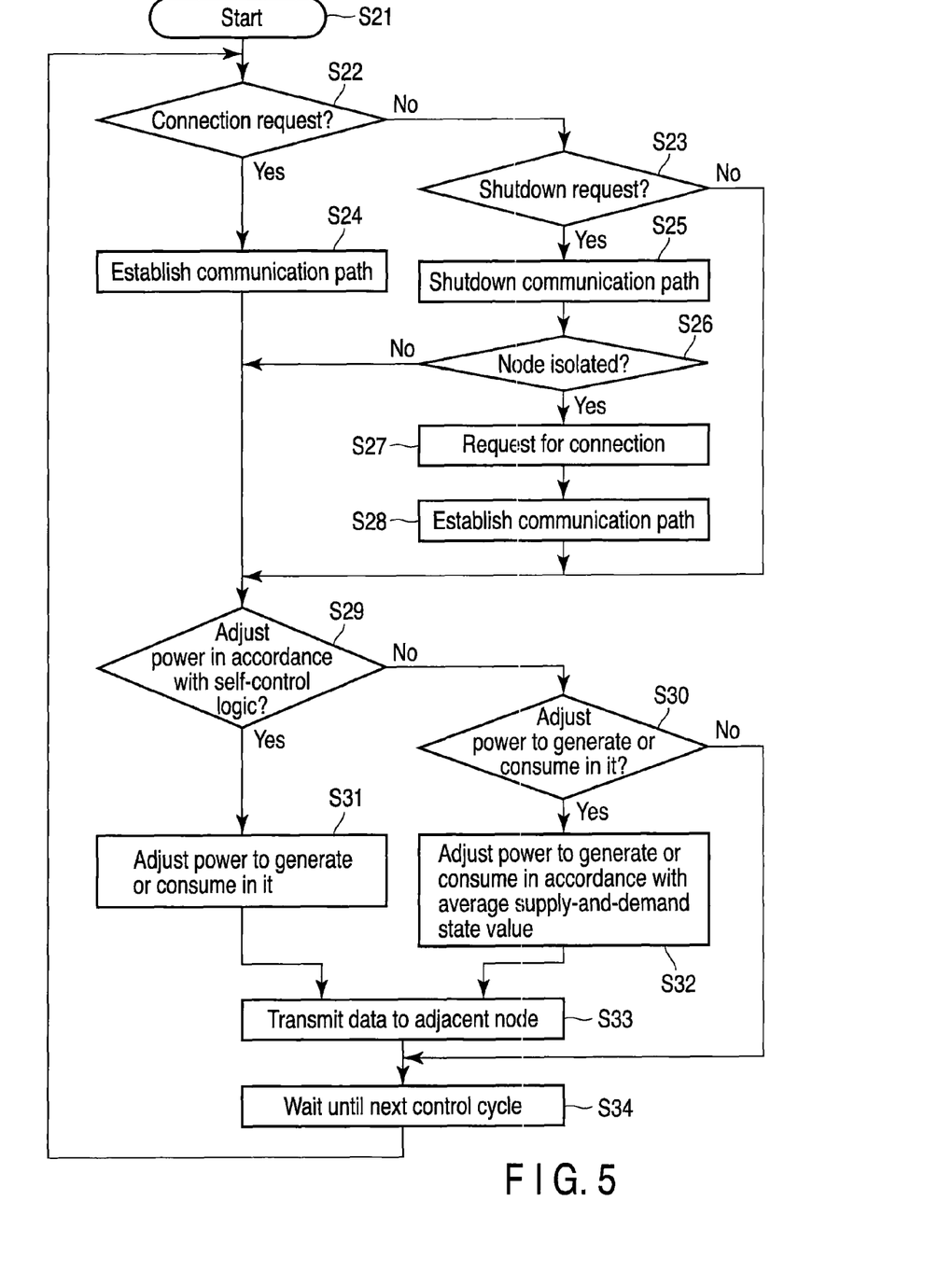
FIG. 5 is a flowchart explaining the operation concerning any node that has received no data in the embodiment.

The basic operation that nodes 10-6 and 10-7 perform on the power non-receiving side in the ordinary communication control mode will be explained with reference to FIG. 5 and FIGS. 6A and 6B.

Node 10-6 (or node 10-7) that works on the power non-receiving side determines, in every control cycle, whether any adjacent node has transmitted a connection request signal or a shutdown request signal (Steps S21 to S23). If node 10-6 (or 10-7) receives a connection request signal (YES in Step S22), node 10-4 establishes a communication path that connects it to the adjacent node (Step S24). On the other hand, if node 10-6 (or 10-7) receives a shutdown request signal (YES in Step S23), node 10-4 shuts down the communication path and then deletes the ID data of the adjacent node from the preset data 111 (Step S25).

After deleting the ID data of the adjacent node, node 10-6 (or 10-7) determines whether the preset data 111 contains the ID data of any other node, or whether it (i.e., a node on the power non-receiving side) is isolated from any other nodes (Step S26). If node 10-6 (or 10-7) determines that it is isolated (if YES in Step S26), it generates a packet that contains its ID data and the connection request data and transmits the packet to the adjacent node (Step S27). Node 10-6 (or 10-7) may receive connection permission data, together with the ID data of the adjacent node. If this is the case, node 10-6 (or 10-7) establishes a communication path connecting it to the adjacent node, and then acquires the ID data of the adjacent node (Step S28).

Thereafter, node 10-6 (or 10-7) receives supply-and-demand state data from node 10-4 or on the average supply-and-demand state data from node 10-4 on the power receiving side or from any other power non-receiving side 10-6 (or 10-7), and then temporarily stores the data as temporary data 112. From the supply-and-demand state data or the average supply-and-demand state data, node 10-6 (or 10-7) determines whether the associated power generation apparatus (one of the pieces 61 to 6M) or the associated load apparatus (one of the pieces 71 to 7N) can adjust the power they generate or consumes in accordance with their self-control logic (self-control mode) (Step S29). If the power cannot be adjusted because the power generation apparatus or load apparatus is connected to a power supply or because of any other reason, the controller 121 of node 10-6 (or 10-7) performs self-control, whereby coordinated control is performed in the entire local power system 3.

In Step S29, node 10-6 (or 10-7) may determine that the power generation apparatuses 61 to 6M or the load apparatuses 71 to 7N can adjust the power they generate or consumes (that is, YES in Step S29.) In this case, node 10-6 (or 10-7) adjusts the power to generate or consume in the associated apparatus (Step S31). If the power generation apparatuses 61 to 6M or the load apparatuses 71 to 7N cannot adjust the power to generate or consume in them (if NO in Step S29,) the controller 121 of node 10-6 (or 10-7) performs self-control, determining whether the power the associated power generation apparatus generates and the power the associated load apparatus consumes can be adjusted (Step S30).

Even if the controller 121 determines that the power to generate or consume in the associated apparatus can be adjusted, the power cannot be adjusted if the output of the apparatus, e.g., power generation apparatus 6M, has exceeded the rated value, or at night if the apparatus is a solar generation unit. In such a case, both the supply-and-demand state and the amount of power generated at present are monitored, thereby to determine whether the power can be adjusted. If it is determined that the power can be adjusted, node 10-6 refers to such an adjustment table 110 as shown in FIG. 6A and adjusts the power generated or consumed in the associated power generation apparatus 6M (Step S32).

Figure 6A:
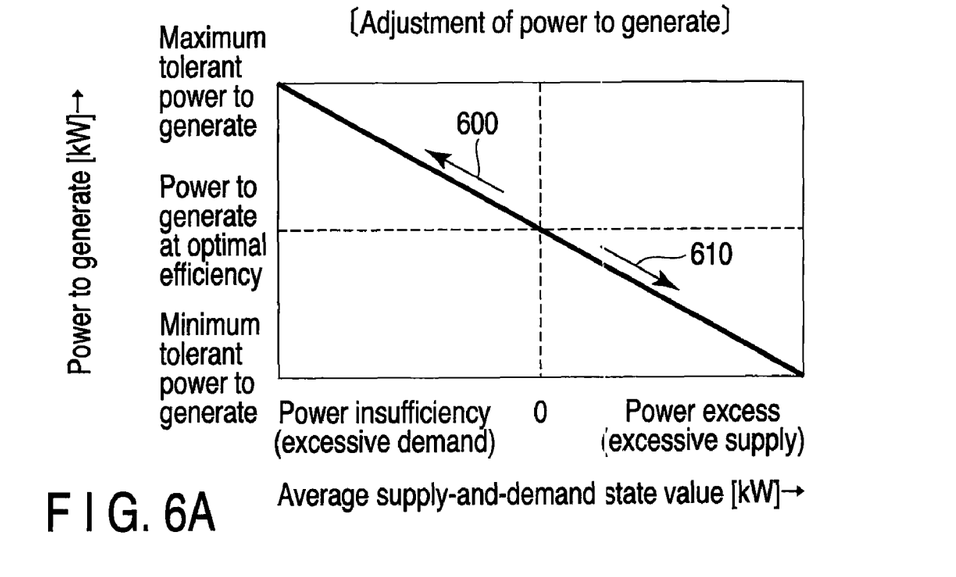
FIGS. 6A and 6B are diagrams explaining an exemplary method of adjusting the power generated and the load exerted in the embodiment.

FIG. 6A is a diagram showing an exemplary adjustment table 110 that may be stored in the power generation apparatuses 61 to 6M. In FIG. 6A, the average supply-and-demand state is plotted on the horizontal axis, the optimal supply-and-demand state is set to value 0 (i.e., center value), and the power insufficiency state (i.e., excessive demand) and power excess state (i.e., excessive supply) are plotted on the left and right of the optimal supply-and-demand state, respectively. In FIG. 6A, amounts of power to generate efficiently, from the minimum tolerant value to the maximum tolerant value, are plotted on the vertical axis. Referring to the adjustment table 110 of FIG. 6A, node 10-6 incorporated in the power generation apparatus 6M increases or decreases the amount of power to generate at present, in accordance with the value plotted on the vertical axis and corresponding to the average supply-and-demand state. More precisely, node 10-6 increases the power if the power supplied is less than the average supply as indicated by arrow 600, and decreases the power if the power supplied is more than the average supply as indicated by arrow 610. That is, node 10-6 performs so-called "self-control" (Step S32). The power is increased or decreased in accordance with the average supply state, e.g., the degree of power insufficiency, because the power can be adjusted once within a specific range set for each power generation apparatus or each load apparatus 7 on the basis of the rated value and some other conditions.

Figure 6B:
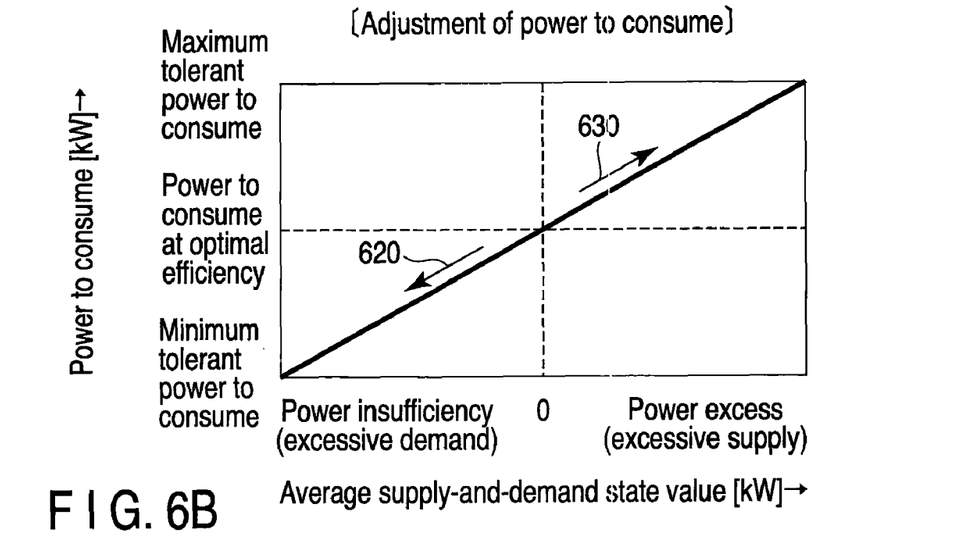

FIG. 6B is a diagram showing an exemplary adjustment table 110 that may be stored in the load apparatuses 71 to 7M. In FIG. 6N, the average supply-and-demand state is plotted on the horizontal axis, and the amounts of power to consume are plotted on the vertical axis. Referring to the adjustment table 110 of FIG. 6B, node 10-7 incorporated in the power generation apparatus 7N increases or decreases the amount of power to consume at present, in accordance with the value plotted on the vertical axis and corresponding to the average supply-and-demand state. More precisely, node 10-7 decreases the power to consume, as indicated by arrow 620, if the power supplied is less than the average supply, and increases the power, as indicated by arrow 630, if the power supplied is more than the average supply. That is, node 10-7 performs so-called "self-control." The power to consume in any load apparatus, too, is increased or decreased in accordance with a prescribed rule.

If the power available is insufficient, more power will be generated. The power generated may be nearly equal to the maximum tolerant value. In this case, additional power generation apparatuses, for example, will be operated. If the power available is excessive, less power will be generated. The power generated is may be nearly equal to the minimum tolerant value. In this case, some or all of the power generation apparatuses will be stopped. The power generated in the system is thereby increased or decreased. As a result, the average supply-and-demand state changes in the local power system.

Next, node 10-6 incorporated in the power generation apparatus 6M adjusts the average supply-and-demand state data it has received, and then transmits a connection request signal to an adjacent node. Node 10-6 may determine that a communication path has been established, connecting it to node 10-6 of any other power generation apparatus that has received its ID data. If this is the case, node 10-6 transmits the average supply-and-demand state data, which has been adjusted, from the communication control unit 120 (Step S33). If a communication path has already been established, which connects node 10-6 to any other node 10-6, node 10-6 transmits the average supply-and-demand state data (i.e., corrected data) without transmitting a connection request signal. After transmitting the average supply-and-demand state data, node 10-6 waits until the next control cycle. Node 10-6 then repeats the processes of Steps S22 et seq. (Step S34).

As processes are performed as described above, the average supply-and-demand state data, corrected little by little, is transmitted to all nodes 10-6 and all nodes 10-7. The note 10-4 can receive the average supply-and-demand state data thus corrected, or the average supply-and-demand state data adjusted by the power measured by the power measuring device 4. More specifically, the corrected average supply-and-demand state data ADc can be calculated by using the following equation (3) if the power to generate is changed by each node 10-6 and the power to consume is changed by each node 10-7.

$$ADc = AD + PI - LI \qquad (3)$$

where AD is the average supply-and-demand state, PI is an increase in power to generate, and LI is an increase in power to consume.

As described above, each of nodes 10-6 and 10-7 dispersed on the network calculates an average supply-and-demand state value and adjusts (increases or decreases) the power to generate or consumed in accordance with the average supply-and-demand state value of the average supply-and-demand state value remains within a tolerance range of power supply-and-demand balance. Thus, in the present embodiment, nodes 10-6 and 10-7 turn on or off all associated electrical apparatuses, either altogether or individually, thereby balancing the power demand and the power supply with each other.

Therefore, this embodiment can provide a power supply-and-demand control system, without installing an equipment management server or a center server which registers the data about the electrical apparatuses 61 to 6M and 71 to 7N and which holds the operating states of the electrical apparatuses, the power generated in the electrical apparatuses 61 to 6M and the power consumed in the electrical apparatuses 71 to 7N. In addition, the embodiment can provide a power supply-and-demand control system that is simple, not requires high installation cost or high maintenance cost, without using a communication means that accords with a complex communication protocol.

In the process of calculating the average supply-and-demand state value at present, the supply-and-demand control may be delayed, inevitably causing a momentary supply-and-demand imbalance, if the data communication is slow or if the adjustment of power to generate or consume is slow in each node. If the delay of supply-and-demand control is short, no problems will arise. If the delay is long, however, the supply-and-demand imbalance will be excessive, possibly falling outside the tolerance range expressed by the relation (2) set forth above. The problem with the delay can be solved, nonetheless, if the average supply-and-demand state value is regarded as a future value, and if the power to generate or consume in each electrical apparatus or the turn-on or turn-off of each electrical apparatus is regarded as a planned value.

That is, each of nodes 10-6 and 10-7 has a schedule control function, or can predict future events, and uses the average supply-and-demand state value as a future value, adjusting (increasing or decreasing) the power to generate or consume in each node. Further, each of nodes 10-6 and 10-7 turns on or off the associated power generation apparatus or the associated load apparatus, and can therefore prevent the supply-and-demand imbalance from becoming excessive.

In order to prevent the supply-and-demand imbalance from becoming excessive, a power storage device, such as a battery, should better be provided in some of the power generation apparatuses 61 to 6M and in some of the load apparatuses 71 to 7N. As the batteries release or accumulate electric charges, the supply-and-demand imbalance is fast eliminated, and the control condition of the relation (2) can be attained at all times.

[Another Embodiment]

Figure 7:
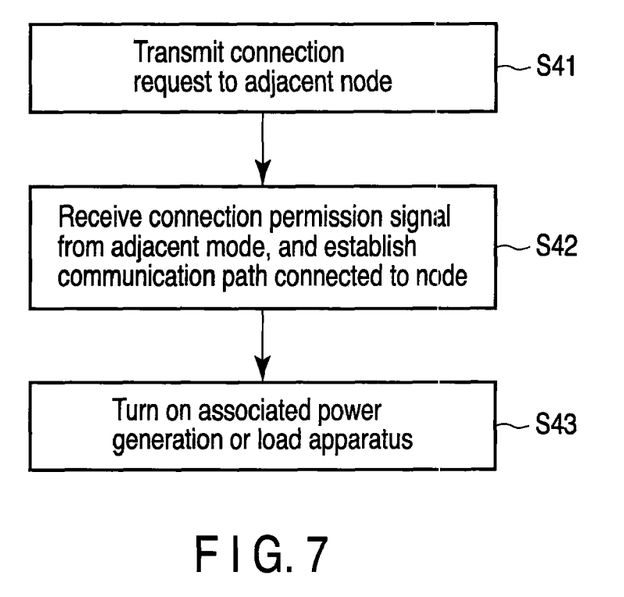
FIG. 7 is a flowchart explaining the process of adding nodes in the embodiment.
Figure 8:
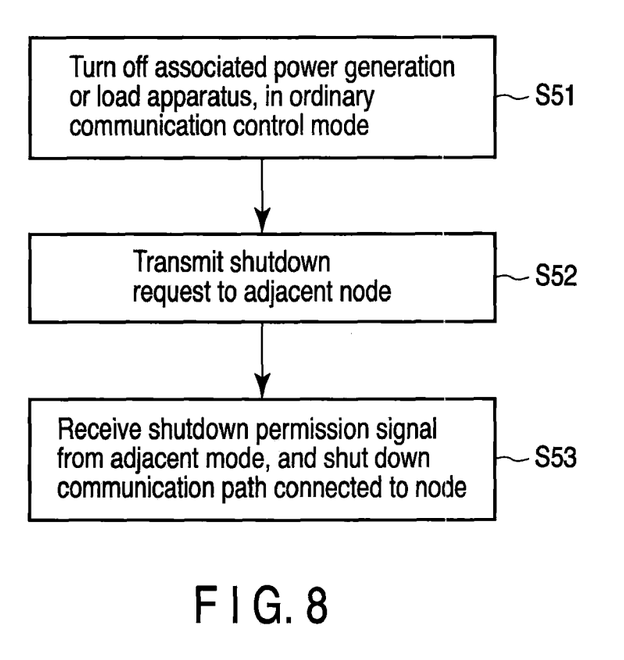
FIG. 8 is a flowchart explaining the process of disconnecting nodes in the embodiment.

FIGS. 7 and 8 are flowcharts explaining how another embodiment of the invention operates. The power supply-and-demand control system according to this embodiment is identical in configuration to the system shown in FIG. 1. Further, each of the nodes used in this system identical in configuration to the node shown in FIG. 2. Therefore, the configuration of the system and that of each node will not be described.

Additional electrical apparatuses may be incorporated in the local power system 3, and unnecessary electrical apparatuses may be removed from the local power system 3 or turned off (rendered inoperative). In other words, additional electrical apparatuses may be plugged in, and unnecessary electrical apparatuses may be plugged out. The present embodiment is concerned with a control that the nodes perform to plug the pieces in and out. Note that the controller 121 of each of nodes 10-4, 10-6 and 10-7 has a control function of plugging in or out any electrical apparatus.

The sequence of controlling the plugging-in of a node 10-6 (or 10-7) on the power non-receiving side, which is incorporated in an additional electrical apparatus, will be first explained with reference to the flowchart of FIG. 7.

To plug node 10-6 (or 10-7) of the additional electrical apparatus, into the local power system 3, communication path must be established, connecting the additional node 10-6 (or 10-7) to any adjacent node, and the additional electrical equipment incorporating node 10-6 (or 10-7), hereinafter called "new node," must be turned on.

At this point, the controller 121 of the new node 10-6 transmits, to the adjacent node, a connection request signal containing its ID data (Step S41). On receiving a connection permission signal and the ID data from any node other than the adjacent node, the new node 10-6 (or 10-7) stores the ID data of the other node as preset data 111 and establishes a communication path connecting it to the adjacent node (Step S42). On confirming that the communication path has been established, the new node 10-6 (or 10-7) turns on the additional power generation or load apparatus, terminating the process of adding a power generation or load electrical apparatus (Step S43). Thereafter, the new node 10-6 (or 10-7) is set to the ordinary communication control mode shown in FIG. 5.

The sequence of controlling the plugging-out of a node 10-6 (or 10-7) of an electrical apparatus to remove from the local power system 3 will be explained with reference to the flowchart of FIG. 8.

To plug out node 10-6 (or 10-7) of the electrical apparatus to remove, from the local power system 3, the electrical apparatus is first turned off and the communication path connecting the additional node 10-6 (or 10-7) to any adjacent node is shut down.

More precisely, the controller 121 of node 10-6 (or 10-7) turns off the associated power generation or load apparatus, in the ordinary communication control mode (Step S51). Further, the controller 121 of node 10-6 (or 10-7) transmits a shutdown request signal containing its ID data, to the adjacent node connected to it by the communication path established (Step S52). If the preset data 111 contains the ID data of any other node with which a consensus has been made, a shutdown request signal containing the ID data of the other node may be transmitted to the adjacent node.

Upon receiving the shutdown permission signal from the adjacent node, node 10-6 (or 10-7) cuts the communication path connecting it to the adjacent node (Step S53). Node 10-6 (or 10-7) deletes the ID data of the other node, which is contained in the preset data 111, terminating the process of removing the power generation or load apparatus from the local power system 3.

To make all nodes share the same average supply-and-demand state value, the communication path needs to contain a direct spanning tree. Assume such an event as shown in FIG. 3B takes place. Then, each of nodes 10-6 and 10-7 recognizes that it isolated from any other node, receiving no data from any adjacent node. In this case, each node requests for a communication path that connects it to any adjacent node, on the basis of its ID data. Thus, each node 10-6 (or 10-7) has a new consensus with an adjacent node and acquires the ID data of this adjacent node and stores the ID data as present data 111.

That is, any isolated node requests for a communication path, on the basis of its ID data, and is connected to an adjacent node by the communication path thereby established. The direct spanning tree can ultimately be established again, whereby all nodes can share the same average supply-and-demand state value, at all times.

As has been described, the system according to one embodiment of this invention does not need a center monitoring/control server. Nonetheless, in the system, the power generation apparatuses and the load apparatuses can perform self-control, mutually adjusting the power to generate the power to consume, respectively, owing to the use of a supply-and-demand control system of distributed and coordinated type. Hence, the system can be a power supply-and-demand control system that achieves a power supply-and-demand balance in the local power system 3.

The system according to another embodiment of this invention is a seamless supply-and-demand control system into which additional electrical apparatuses can be incorporated (plugged in) and from which unnecessary electrical apparatuses can be removed (plugged out). Therefore, a high-level supply-and-demand control function can be implemented in every power generation apparatus and every load apparatus. This accomplishes a positive demand-side control (DSC), ultimately providing a power supply-and-demand control system more efficient and less expensive than the conventional systems. This system can save energy in electrical equipment, can encourage the use of natural energy, and can achieve an electric power use that does not adversely influence the commercially available power system 1.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A power supply-and-demand controls system comprising:
a plurality of nodes incorporated in electrical apparatuses, respectively, each electrical apparatus including at least one of a power generation apparatus and a load apparatus, either supplied with power from a commercially available power system; and
a communication unit configured to achieve communication between the nodes,
wherein each of the nodes comprises:
a communication path unit configured to establish a communication path for transmitting and receiving data to and from any adjacent node through the communication unit;
a communication control unit configured to receive average supply-and-demand state data from the adjacent node through the communication path established; and
a controller configured to adjust the power to generate or consume in the electrical apparatus incorporating the node, in accordance with the average supply-and-demand state data, and to calculate an average supply-and-demand state value corrected based on the value by which the power has been adjusted.

2. The system according to claim 1, wherein each of the nodes includes a data storage unit configured to store an adjustment table containing reference data for use in adjusting the power to generate or consume in the electrical apparatus, in accordance with the average supply-and-demand state data.

3. The system according to claim 2, wherein each of the nodes turns on or off the power generation apparatus or load apparatus incorporating it, thereby to adjust, in a tolerance range, the power to generate or consume in the electrical apparatus with reference to the adjustment table and in accordance with the average supply-and-demand state data.

4. The system according to claim 1, wherein the communication path unit transmits a connection request through the communication unit and establishes a communication path connected to the adjacent node that transmits connection permission in response to the connection request.

5. The system according to claim 1, wherein the communication control unit transmits data representing the corrected average supply-and-demand state calculated by the controller, to any other node connected to the node by the communication path.

6. The system according to claim 1, wherein each of the nodes takes consensus with a plurality of adjacent nodes, thereby establishing communication paths, and exchanges the corrected average supply-and-demand state value with the adjacent nodes, thereby adjusting a supply-and-demand balance in a local power system composed of the electrical apparatuses supplied with power from the commercially available power system.

7. The system according to claim 1, further comprising a leader node provided between a power receiving unit supplied with power from the commercially available power system and a local power system composed of the electrical apparatuses, and configured to transmit data to each of the nodes, the data corresponding to a supply-and-demand imbalance in the local power system.

8. The system according to claim 1, wherein each of the nodes has a schedule control function of using the average supply-and-demand state value as a future value, adjusting the power to generate or consume, in order to prevent the supply-and-demand imbalance from becoming excessive.

9. The system according to claim 1, wherein each of the nodes establishes a communication path connected to a new node incorporated in an electrical apparatus added to a local power system composed of the electrical apparatuses, in order to plug in the new node; and the new node adjusts the power to generate or consume in it, on the basis of the present average supply-and-demand state value received from each of the nodes through the communication paths, and transmits the average supply-and-demand state value corrected by adjusting the power.

10. The system according to claim 1, wherein for the purpose of plugging out a node from an electrical apparatus connected to a local power system composed of the electrical apparatuses, each of the nodes shuts down a communication path connected to the node to plug out, in response to a shutdown request coming from the node to plug out; and the node to plug out turns off the electrical apparatus incorporating it.

11. The system according to claim 1, wherein each of the nodes regards itself as isolated, if it receives no connection request and no average supply-and-demand state value within a predetermined time, and transmits a connection request signal to the adjacent node when it regards itself as isolated, thereby establishing a communication path.

12. The system according to claim 11, wherein each of the nodes transmits a connection request signal to adjacent nodes in a prescribed priority order if it regards itself as isolated, and establishes transmission paths connected to the adjacent nodes on receiving a connection permission signal responding to the connection request signal, thereby establishing a direct spanning tree connected to all other nodes.

13. The system according to claim 1, wherein the power generation apparatus or the load apparatus includes a power storage device.

14. A node for supply-and-demand control in a local power system, comprising:
a communication unit configured to achieve communication between two of nodes incorporated in electrical apparatuses, respectively, each electrical apparatus including at least one of a power generation apparatus and a load apparatus, either supplied with power from a commercially available power system;
a communication path unit configured to establish a communication path for transmitting and receiving data to and from any adjacent node through the communication unit;
a communication control unit configured to receive average supply-and-demand state data from the adjacent node through the communication path established; and
a controller configured to adjust the power to generate or consume in the electrical apparatus incorporating the node, in accordance with the average supply-and-demand state data, and to calculate an average supply-and-demand state value corrected based on the value by which the power has been adjusted.

15. The node according to claim 14, wherein further comprising a leader node provided between a power receiving unit supplied with power from the commercially available power system and a local power system composed of the electrical apparatuses, and configured to transmit data to each of the nodes, the data corresponding to a supply-and-demand imbalance in the local power system.

16. A method of performing a supply-and-demand control in a local power system, comprising:

establishing a communication path for transmitting and receiving data between two of nodes incorporated in electrical apparatuses, respectively, each electrical apparatus including at least one of a power generation apparatus and a load apparatus, either supplied with power from a commercially available power system;

adjusting the power to generate or consume in the electrical apparatus incorporating the node, in accordance with the average supply-and-demand state data transmitted from the node through the communication path; and calculating an average supply-and-demand state value corrected based on the value by which the power has been adjusted, and transmitting the average supply-and-demand state value to the node through the communication path.

17. The method according to claim 16, further comprising:
transmitting data corresponding to a supply-and-demand imbalance in the local power system from a leader node provided between a power receiving unit supplied with power from the commercially available power system and the local power system composed of the electrical apparatuses, to the nodes incorporated in the electrical apparatuses.

* * * * *

CERTIFICATE OF CORRECTION

| | | |
|---|---|---|
| PATENT NO. | : 8,140,194 B2 | |
| APPLICATION NO. | : 12/694428 | |
| DATED | : March 20, 2012 | |
| INVENTOR(S) | : Iino et al. | |

It is certified that error appears in the above-identified patent and that said Letters Patent is hereby corrected as shown below:

Title page, item (57), in the Abstract, line 4, change "transmits and receive" to --transmits and receives--.

Claim 1, column 13, line 6, change "controls system" to --control system--.

Signed and Sealed this
Thirty-first Day of July, 2012

David J. Kappos
*Director of the United States Patent and Trademark Office*